L. S. MARING.
MACHINE FOR BORING CARRIAGE WHEEL HUBS.
No. 10,087.                    Patented Oct. 4, 1853.
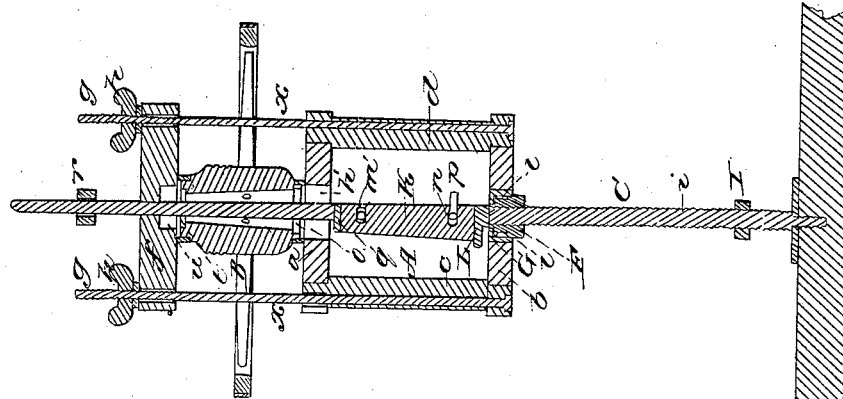
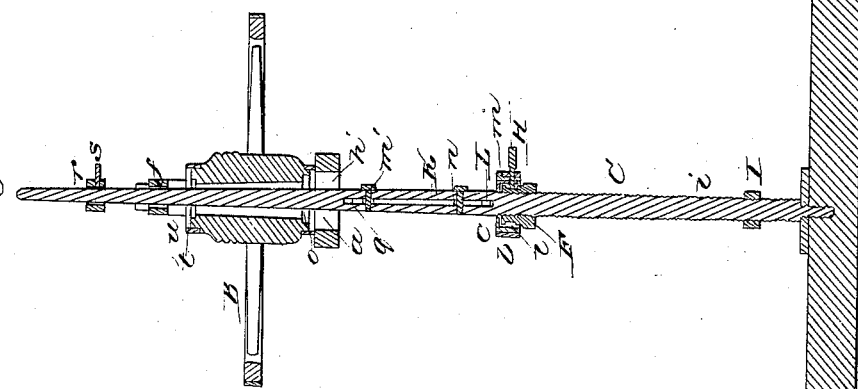
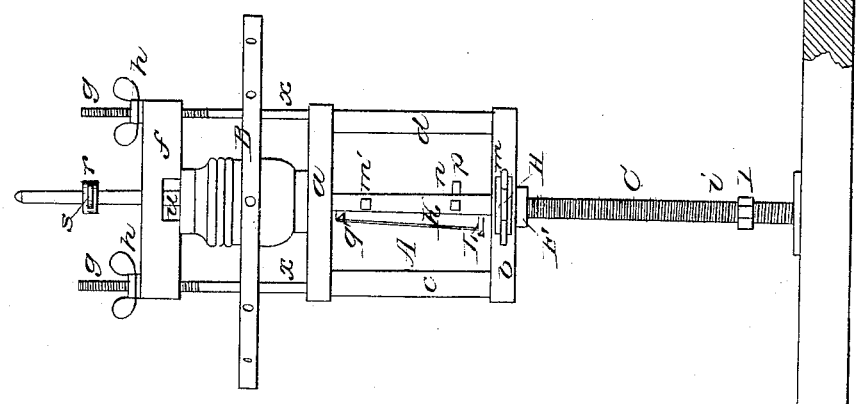

UNITED STATES PATENT OFFICE.

LEONARD S. MARING, OF WESTPORT, MASSACHUSETTS.

CUTTER FOR BORING WHEEL-HUBS.

Specification of Letters Patent No. 10,087, dated October 4, 1853.

*To all whom it may concern:*

Be it known that I, LEONARD S. MARING, of Westport, in the county of Bristol and State of Massachusetts, have invented a new and useful Machine for Boring Carriage-Wheel Hubs for Correctly Setting Pipe-Boxes Therein; and I do hereby declare that the same is fully described and represented in the following specification and the accompanying drawings, letters, figures, and references thereof.

Of the said drawings Figure 1, denotes a front elevation of my machine, as applied to a wheel. Fig. 2, is a central, longitudinal and vertical section of it. Fig. 3, is a central, vertical and transverse section of it.

In the said drawings A, represents a rectangular frame, composed of two horizontal parallel heads or bars, $a$, $b$, united together by two vertical ties $c$, $d$. From this frame two rods $x$, $x$ extend upward and pass through a cross bar, $f$, and have screws, $g$, $g$, cut on their upper parts. Thumb screw nuts $h$, $h$, are screwed respectively on the screws as seen in the drawings. These screw rods $x$, $x$, the cross bar $f$, and the nuts $h$, $h$, serve to confine a wheel B to the head or bar $a$ of the frame A, when such wheel is placed between the bar, $a$, and the crossbar, $f$, as seen in the drawings.

Through the middle of the bar, $a$, of the frame, A, there is a circular opening or passage, $h'$, it being made of a diameter large enough to permit the cutting tool (to be hereinafter described) to pass through it and into the hub of a wheel. A long shaft C extends through the middle of the frame, A, the wheel, B, and the bar, $f$. The lower part of this shaft has a male screw $i$, cut on it for about two fifths the length of the shaft. From the screw the shaft is made to taper upward or to be formed as seen in the drawings. There is a screw nut, F, placed on the screw of this shaft, and made to revolve freely in a metallic box, G, set and firmly fixed into the lower bar, $b$, of the frame A. The nut is formed with a groove, $l$, around it, for the reception of the end of a clamp screw, H, that extends into the bar, $b$, and is screwed through a plate, $m$, for the purpose of confining the nut F, to the frame A. There is another nut, I, placed on the screw, this last nut being a gage nut, and is to regulate the distance for the entrance of the cutter into the hub. The said cutter is shown at K. It is inserted in a mortise made through the shaft and confined by set or clamp screws $m'$, $n$, by which its cutting edge may be adjusted so as to cut the required taper for any box. Its cutting edge is not arranged parallel to the axis of the shaft, but so as to cut a conical hole in the hub when revolved. At the lower end of this cutter, there is another cutter, L, which projects from the shaft beyond the cutting edge of the first, and is intended to cut the recess, $o$, in the hub, that receives the stationary shoulder or collar of an axle. Attached to shaft C is a small projection, $p$, which I term a backer. It extends from the shaft axis the same distance there is from the axis to that part of the edge of the knife K, which is in the same horizontal plane with it. The object of this backer is to keep the lower part of the knife up to the wood, and prevent it from springing away from it. The projection after entering the space bored in the hub, rests against the inner surface of the bore, and thus keeps the knife close up to the wood. While the knife, K, forms the curved side of the tapering bore, another or smaller cutter, $q$, placed at the upper end of the knife is used to cut away that part of the wood between the circle of the bore and shaft.

On the upper part of the shaft C, there is a slide, $r$, which is so adapted to the shaft as to move or slide freely on it, in a longitudinal direction. It is held or fixed in place on the shaft by a set screw, $s$, made to screw into it and against the shaft.

In the use of my machine the wheel is placed with one end of its hub on the middle of the bar $a$, of the frame, A, (the shaft C being inserted and fixed in a bench or floor, and made to stand vertically and pass through the hole usually made in the hub of the wheel,) and the bar $f$ brought down upon the other or upper end, and forced down upon it by setting down the screw nuts, $h$, $h$. The clamp screw, H, is next unscrewed, so as to unclamp the screw nut F from the frame A, in order that the said frame may be put in revolution on the said nut. This done, the frame A, and the wheel is to be revolved in order to ascertain whether the periphery of the outside of the wheel tire has its center in the axis of the shaft C. If it has not, the wheel must be removed laterally in a proper manner until this is attained, which having been accomplished the wheel should be firmly confined in place, by setting down the screw nuts $h, h$. Next the screw nut, F, is to be clamped to the frame, A, by turning up the clamp screw H. This having been done, we next measure the distance from the lower end of the wood part of the wheel hub, down to the lower part of the cutter L, and we arrange the gage nut I on the shaft C at the same distance, from and below the nut F. We next rotate the frame A, so as to cause the screw nut F, to descend on the shaft C. This will carry the wheel down against the cutters $q$ and K and cause them to form the tapering hole, for the reception of the wheel box. When and while the wheel descends upon the cutter L, such cutter will form the recess, $o$, hereinbefore mentioned. After all this is accomplished, there is another and similar recess, $t$, to be made in the other end of the hub, for the reception of the nut which is screwed on to the axle. In order to enable such last named recess to be formed, the bar, $f$ is notched or recessed from its underside upward as seen at $u$. This enables us to remove the small or upper cutter, $q$, from the shaft C and insert in its place a cutter that shall project beyond the cutting edge of the cutter, K, and cut downward into the hub, when the frame A is next rotated in a reverse direction or so as to cause it to ascend on the shaft C. By adjusting the slide, $r$, on the shaft C, to the proper position, the descent of the cutter into the top of the hub will be arrested, when the top of the bar $f$ is brought up against the slide. After the formation of either recess as described, we complete it by unclamping the nut F, from the frame, A, and turning the said frame around on the nut.

Having thus described my machine, what I claim is, as follows,

I claim the combining the backer, $p$, with the shaft C, and the knife K for the purpose above set forth.

In testimony whereof, I have hereto set my signature this twelfth day of November A. D. 1852.

L. S. MARING.

Witnesses:
R. H. EDDY,
F. P. HALE, Jr.